United States Patent
Kodama et al.

(10) Patent No.: US 6,305,526 B1
(45) Date of Patent: Oct. 23, 2001

(54) AMPULE TRANSFER UNIT

(75) Inventors: Tsuyoshi Kodama; Toshihiro Amatsu, both of Osaka (JP)

(73) Assignee: Kabushiki Kaisha Yuyama Seisakusho, Osaka (JP)

( * ) Notice: Subject to any disclaimer, the term of this patent is extended or adjusted under 35 U.S.C. 154(b) by 0 days.

(21) Appl. No.: 09/542,930

(22) Filed: Apr. 4, 2000

(30) Foreign Application Priority Data

Apr. 8, 1999 (JP) ................................................ 11-101548

(51) Int. Cl.[7] .................................................. B65G 29/00
(52) U.S. Cl. ......................................... 198/463.4; 198/531
(58) Field of Search ............................. 198/459.6, 463.4, 198/530, 531, 532, 443, 451

(56) References Cited

U.S. PATENT DOCUMENTS

| | | | |
|---|---|---|---|
| 4,040,513 | * 8/1977 | Walls | 198/530 |
| 4,063,635 | * 12/1977 | Heckel | 198/531 |
| 5,959,258 | * 9/1999 | Howard | 198/532 X |
| 6,024,204 | * 2/2000 | Van Dyke, Jr. et al. | 198/459.6 |
| 6,092,977 | * 7/2000 | Fuchigami | 198/531 X |

FOREIGN PATENT DOCUMENTS

| | | |
|---|---|---|
| 5-229660 | 9/1993 | (JP) . |
| 10-265052 | 10/1998 | (JP) . |

* cited by examiner

Primary Examiner—James R. Bidwell
(74) Attorney, Agent, or Firm—Wenderoth, Lind & Ponack, L.L.P.

(57) ABSTRACT

An ampule transfer device for receiving ampules from a first conveyor and transferring them to a second conveyor. The device includes a stocker that is vertically movably mounted and a guide that is pivotally mounted. The stocker has a base member, an end member and a lid plate for closing the opening between the base member and the end member. The lid plate is biassed to its closed position. When the lid plate is disengaged from the base member due to movement of the member, the lid plate is fully opened under the weight of ampules. As the end member is moved in an opening direction, the ampules are gradually discharged toward the second conveyor.

4 Claims, 8 Drawing Sheets

AMPULE TRANSFER UNIT

BACKGROUND OF THE INVENTION

This invention relates to an ampule transfer unit for transferring ampules from a first conveyor to a second conveyor that intersects the first conveyor.

A conventional ampule dispenser disclosed in unexamined Japanese patent publication 5-229660 comprises a plurality of cassettes each storing ampules one upon another in a horizontal position and adapted to discharge the ampules downwardly, a first conveyor for feeding the ampules discharged from the cassettes in one direction, and a second conveyor extending in a different direction from the first conveyor for receiving the ampules from the first conveyor. The conveyors have cushioning members such as sponges for softening shocks when the ampules are dropped onto the second conveyor.

Even though the conveyors have cushioning members, the ampules may break by colliding against each other if a plurality of them are discharged at one time.

Another conventional ampule dispenser disclosed in unexamined Japanese patent publication 10-265052 which comprises a plurality of cassettes and first and second conveyors similar to those disclosed in the former publication, and an intermediate container for receiving the ampules from the first conveyor and discharging them onto the second conveyor by opening its bottom.

When the bottom of the container is opened, the ampules in the container tends to be discharged all at once, so that they tend to break by colliding against each other.

An object of the invention is to provide an ampule transfer unit that can transfer ampules from the first to second conveyors without the possibility of breakage of ampules by colliding against each other.

SUMMARY OF THE INVENTION

According to this invention, there is provided an ampule transfer device provided between a first station and a second station located at a lower level than the first station for receiving ampules from the first station and delivering the ampules to the second station, the device comprising a stocker and a first drive unit for moving the stocker up and down, the stocker comprising a base member having a first edge, an end member coupled to the base member so as to be movable between a closed position and an open position relative to the base member, a second drive unit for moving the end member between the closed and open positions, a lid member having a second edge and coupled to the end member so as to be movable relative to the end member between a closed position and an open position, the end member and the lid member being arranged such that the second edge engages the first edge when the end member and the lid member are in their respective closed positions, and disengages from the first edge when the end member is moved from its closed position toward its open position by the second drive unit, whereby forming an opening between the first and second edges, the lid member being adapted to be movable toward its open position when the second edge disengages from the first edge, whereby widening the opening between the first and second edges.

To receive ampules from the first station, the stocker is raised to the highest position by the first drive unit. When a predetermined number of ampules have been received in the stocker, the first drive unit now lowers the stocker to the lowest position near the second station. The second drive unit then pivots the end member to disengage the lid member from the base member, thereby forming an opening between the lid and the base member. When the lid disengages from the base member, the lid is allowed to gradually pivot to its open position under the weight of the ampules in the stocker against the force of the spring biasing the lid toward the closed position. Since the lid is opened gradually against the force of the spring, the opening widens gradually, so that the ampules can be discharged slowly through the opening without colliding hard against each other. Thus there is little possibility of the ampules being damaged.

DETAILED DESCRIPTION OF THE PREFERRED EMBODIMENT

Figure 1:
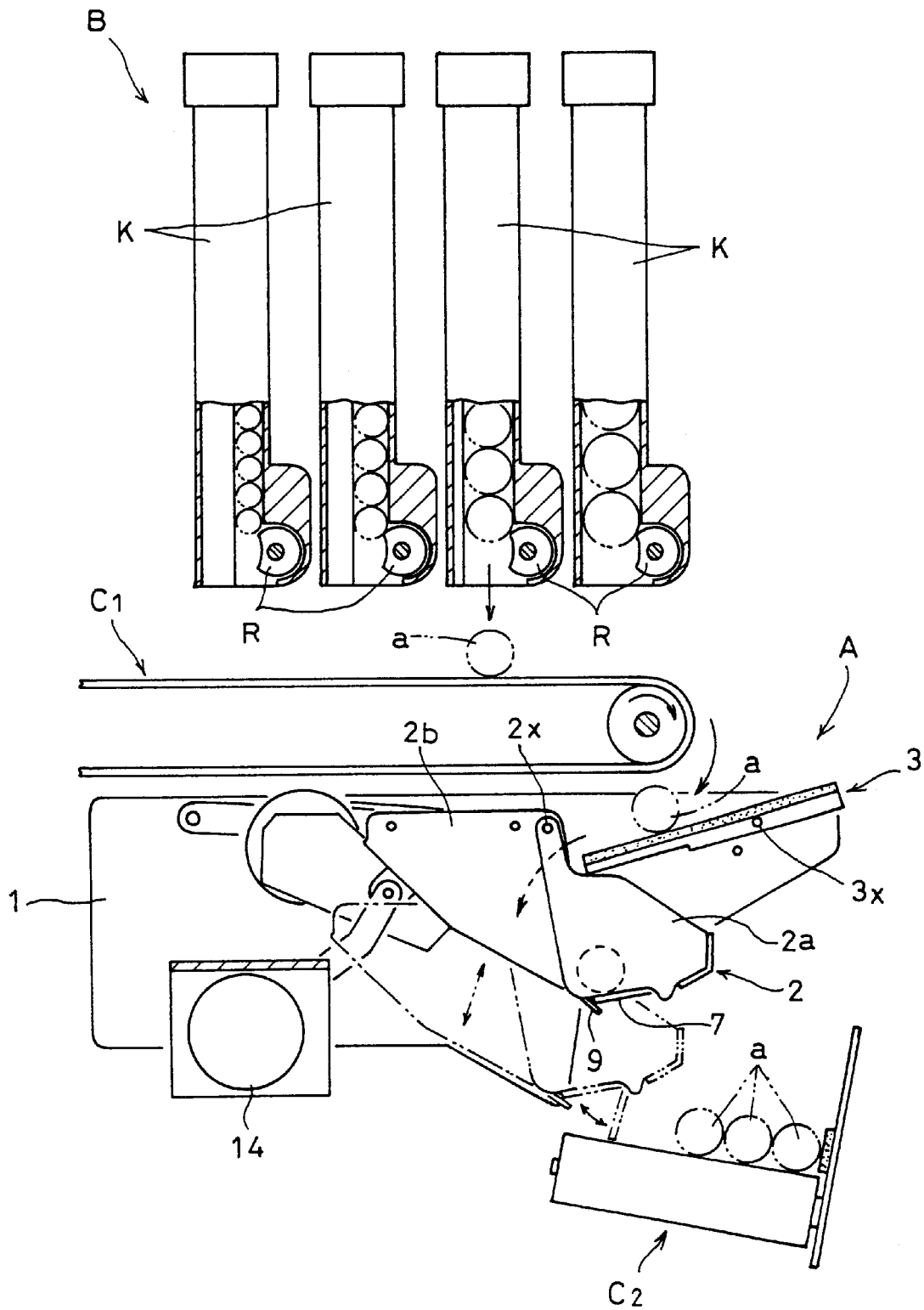
FIG. 1 is a side view of an ampule transfer device according to the present invention.

Now referring to the drawings, the ampule transfer unit A embodying the invention is provided between a first conveyor C1 for receiving ampules "a" from an ampule dispenser B, and a second conveyor C2 provided under the first conveyor so as to extend across the first conveyor C1 for receiving the ampules from the first conveyor and feeding them to the intended station.

The ampule dispenser B, which is conventional, comprises a plurality of cassettes K each storing ampules having a different size from those in the other cassettes and piled one upon another in a horizontal position. At its bottom, each cassette has a substantially semicylindrical roller R for discharging the ampules one by one by rotating. The cassettes K are individually received in drawer units, not shown, arranged in a plurality of rows and housed in a case, not shown either. (For details of the dispenser B, see Japanese patent publication 5-22960.) The ampules discharged from the cassettes are fed on the first conveyor C1 and dropped into the ampule transfer unit A.

Figure 2:
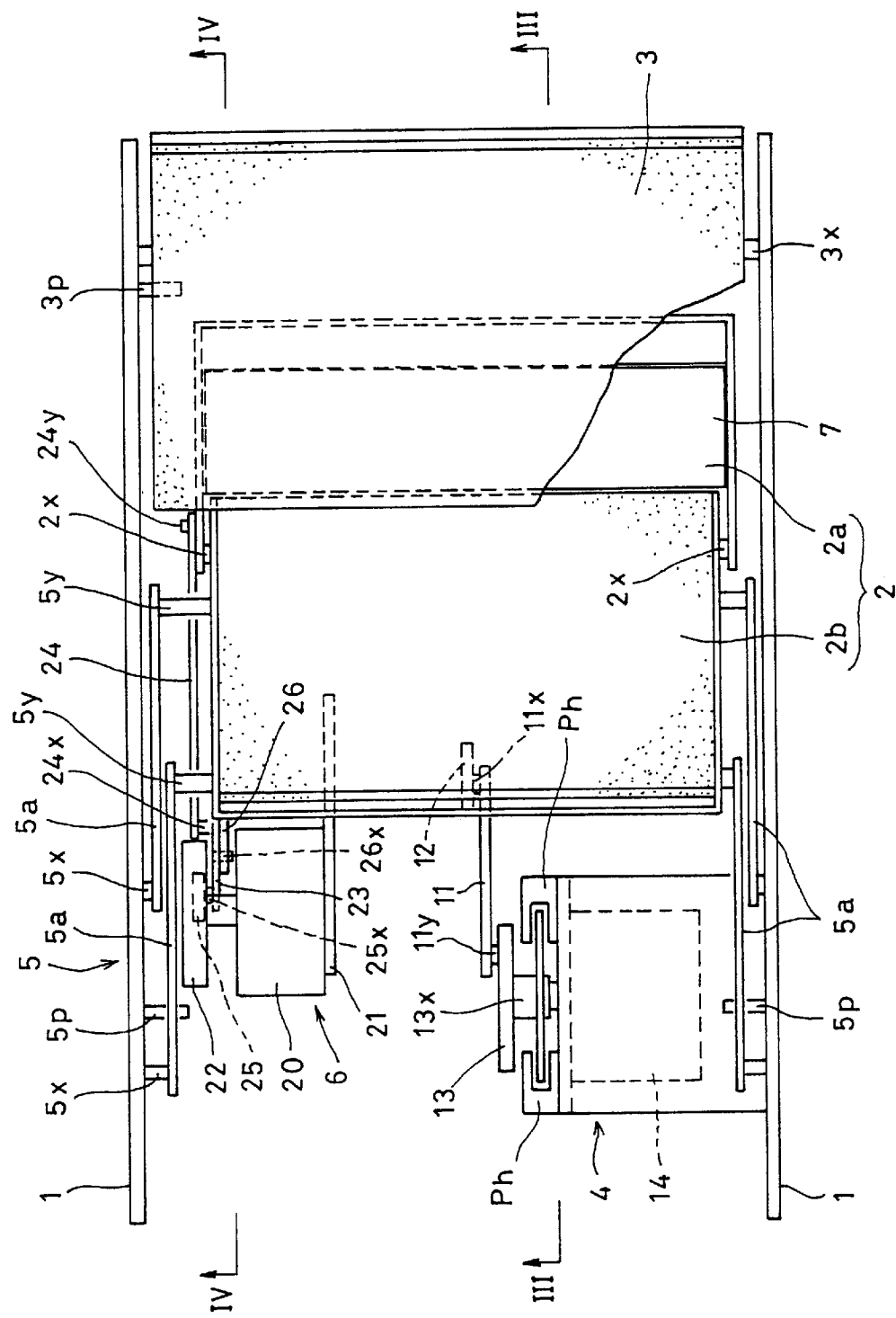
FIG. 2 is a plan view of the same.
Figure 3:
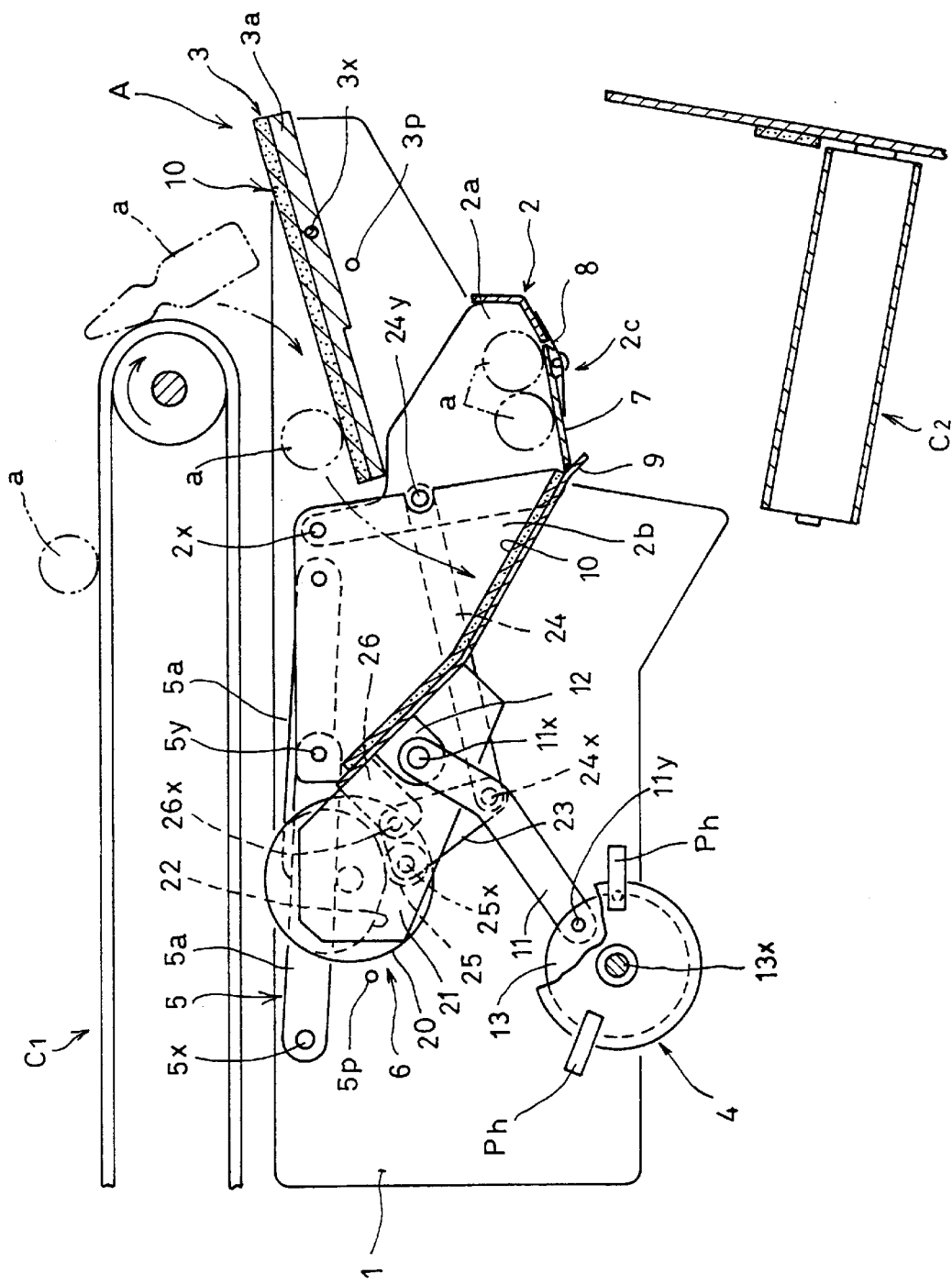
FIG. 3 is a sectional view along line III—III of FIG. 2.
Figure 4:
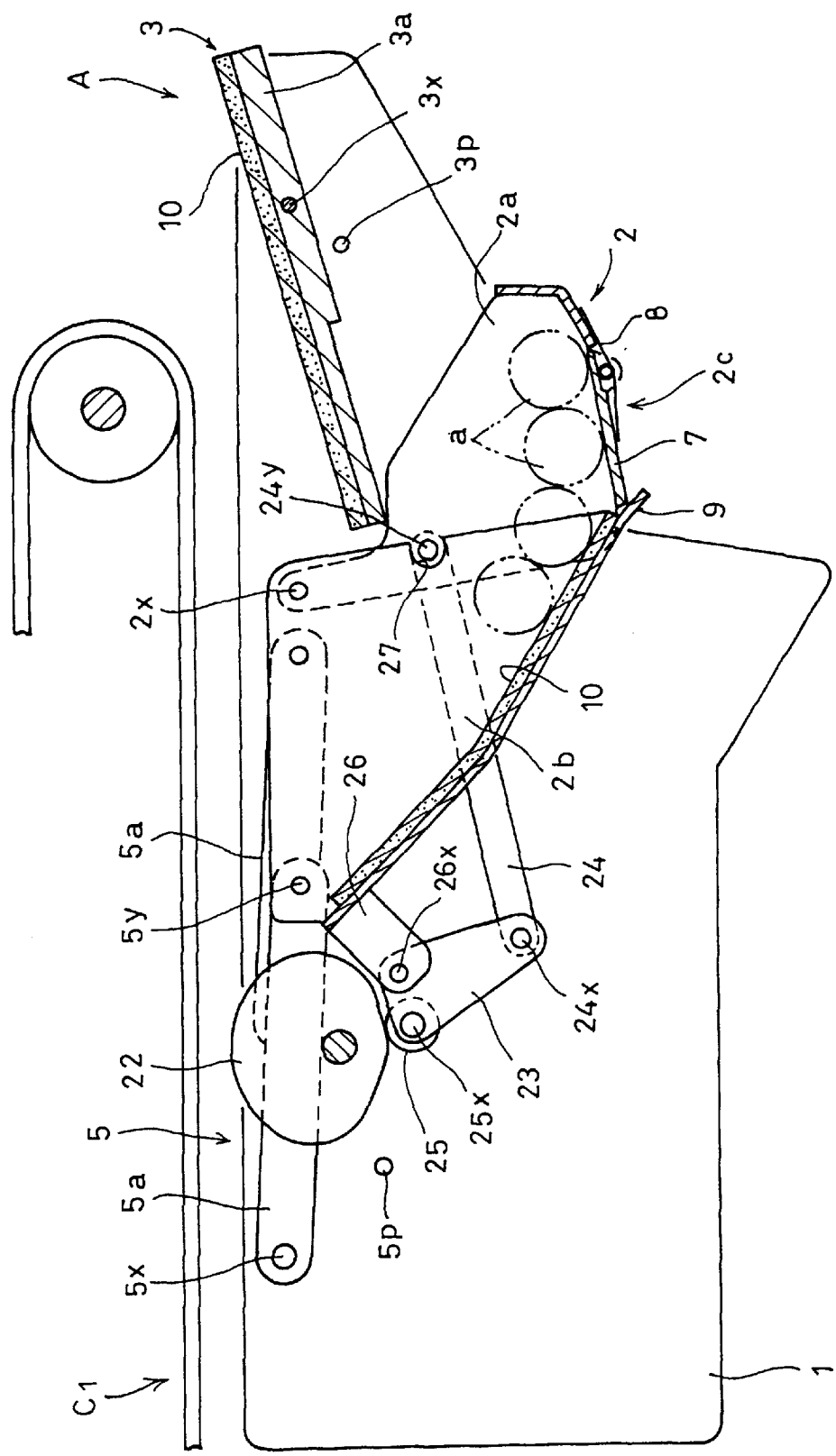
FIG. 4 is a sectional view along line IV—IV of FIG. 2.
Figure 5:
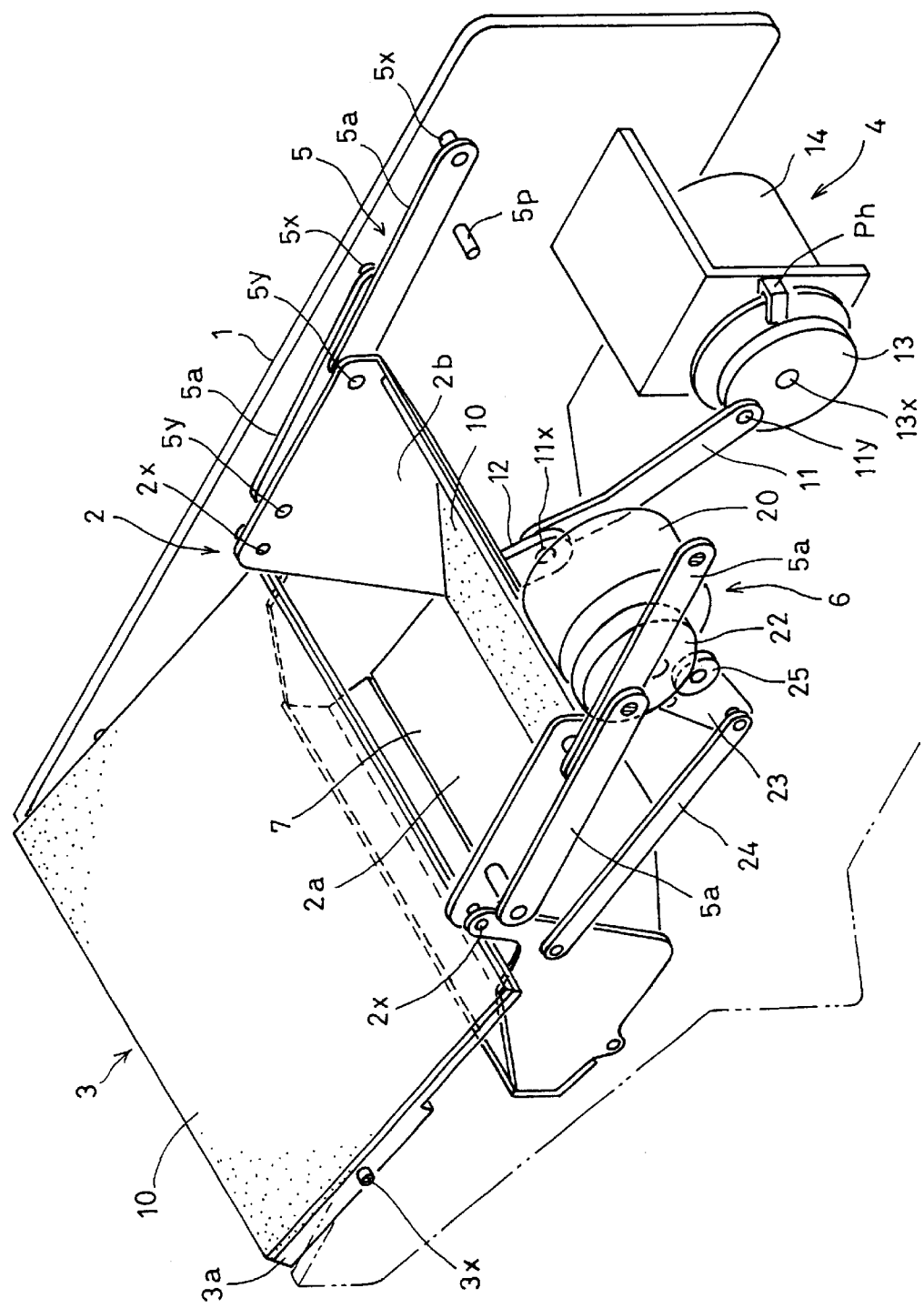
FIG.5 is a perspective view of the device of FIG. 1.

As shown in FIGS. 2–4, the ampule transfer unit A includes a pair of side plates 1 forming a support frame, a stocker 2 provided between the side plates 1 for temporarily storing the ampules, and a guide 3 provided above the end portion of the stocker 2 so as to be pivotable about pins 3x fixed to the side plates 1.

The stocker 2 is moved obliquely upwardly and downwardly by a drive unit 4 between a first position where it receives the ampules from the first conveyor C1 and a second position where it discharges the ampules to the second conveyor C2. A link mechanism 5 prevents the stocker 2 from pivoting when it is moved up and down. The stocker comprises a base member 2b having a substantially U-shaped frame and a substantially rectangular (as viewed from top) bottom plate surrounded by the U-frame, and an end member 2a having a substantially U-shaped (as viewed from top) frame with its sides superposed on the sides of the U-shaped frame of the base member 2b so as to be pivotable about pins 2x secured to the side frame of the base member 2b, and a lid plate 7 having its righthand edge (in FIG. 3) pivotally coupled to the base of the U-frame through a coil spring 8 biasing the plate 7 in the clockwise direction about its righthand edge until its lefthand edge is pressed against the righthand edge of the bottom plate of the base member 2b (closed position). The lid plate 7 closes the opening of the stocker 2.

The plate 7 is locked in the closed position by a locking member 9 provided at the righthand edge of the base member 2b. The force of the spring 8 is such that when the plate 7 disengages from the locking member with a predetermined number of ampules on the plate, the plate 7 is adapted to pivot counterclockwise against the force of the spring 8 to the open position. A leaf spring or any other elastic means may be used in place of the coil spring to bias the plate 7 to the closed position.

To prevent breakage of the ampules on the first conveyor when they drop from the first conveyor by colliding against each other, they are dropped first onto the guide 3 and then into the stocker 2. As shown in FIG. 3, the guide 3 has a guide plate 3a supported on the pins 3x at its portion nearer to its righthand end so as to pivot counterclockwise (in FIG. 3) until it abuts a stopper pin 3p.

An elastic sheet 10 is applied to the bottom of the base member 2b and the top surface of the guide 3 to avoid the breakage of the ampules.

The parallel link mechanism 5 comprises a first pair of links 5a each having one end thereof pivotally coupled to one of the side plates 1 through a pin 5x and the other end pivotally coupled to one side of the U-shaped frame of the base member 2b through a pin 5y, and a second pair of links 5a coupled to the other side plate 1 and the other side of the U-frame in the same manner as the first pair of links.

The drive unit 4 comprises a motor 14 (FIG. 2), a disk 13 coupled through a shaft 13x to the output shaft of the motor 14, and a crank arm 11 having one end thereof coupled to the disk 13 through an axis 11y at its off-center position and the other end to a mounting seat 12 secured to the bottom plate of the base member 2b at its transverse center. The crank arm 11 is pivotable around an axis 11x. Sensors Ph detect the vertical position of the stocker 2. The sensors Ph may be light sensors, magnetic sensors, supersonic sensors or any other sensors.

An actuator unit 6 is provided to pivot the end member 2a about the pins 2x. It comprises a motor 20 mounted on the bottom of the base member 2b through a mounting plate 21, a substantially egg-shaped cam plate 22 coupled to the motor 20 at an eccentric position, a triangular plate 23 carrying a roller 25 at one apex thereof so as to be pivotable about a pin 25x supporting the plate 23 near another apex thereof, and an arm 24 having one end thereof pivotally coupled to the other apex of the plate 23 through a pin 24x and the other end pivotally coupled to one side of the U-frame of the end member 2a through a pin 24y. The cam 22 and the triangular plate 23 are positioned such that the roller 25 is always in contact with the cam.

Figure 8:
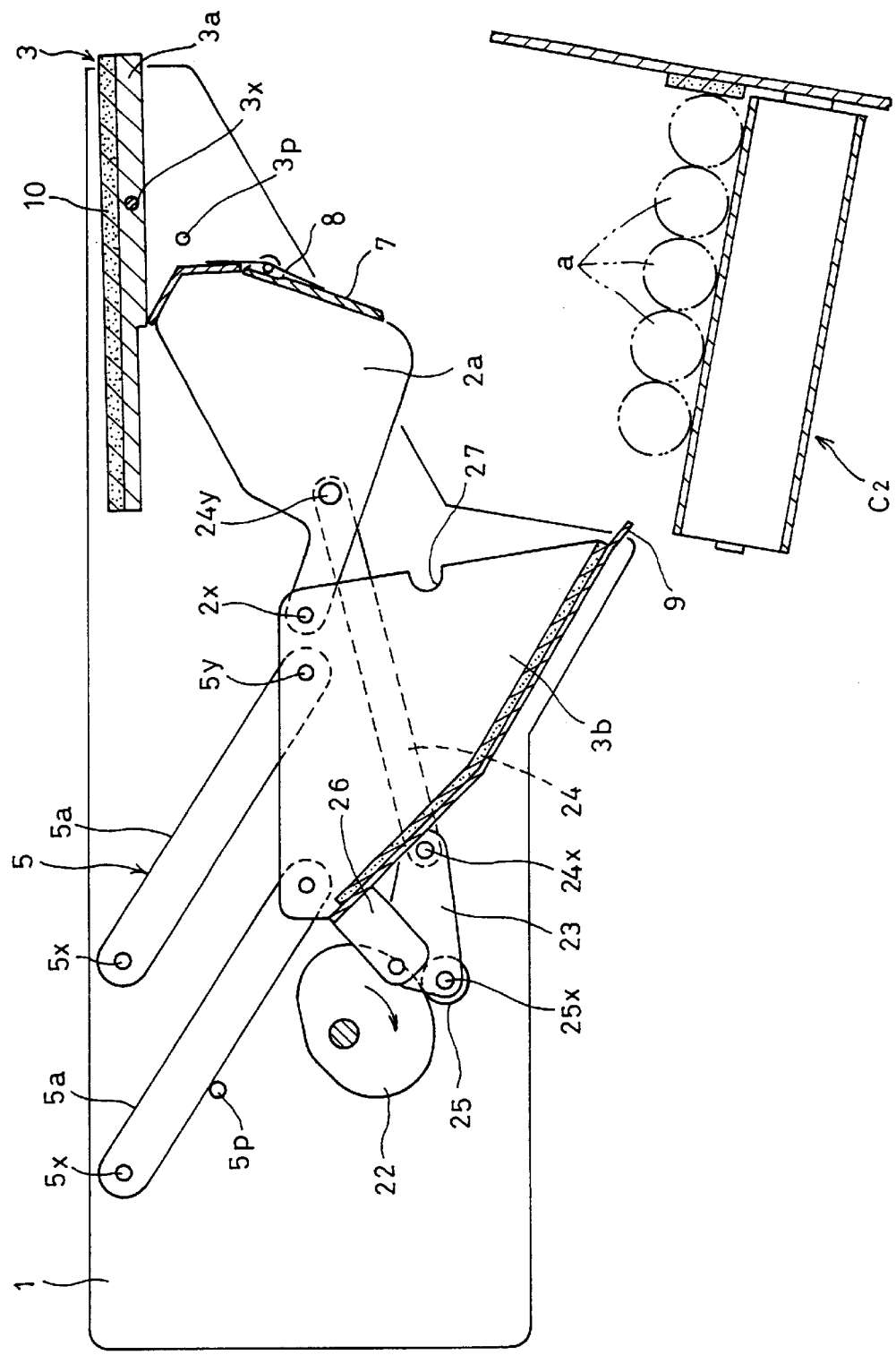

The cam 22 is rotated between the positions shown in FIGS. 4 and 8 to move the end member 2a between the closed position (FIG. 4) and the fully open position (FIG. 8). The degree and timing of opening of the end member 2a are adjustable by changing the shape and mounting position of the cam. The closed position and the fully open position of the end member 2a are detected by an unillustrated sensor.

Now in operation, with the stocker 2 raised to the highest level as shown in FIGS. 3 and 4, the ampules on the first conveyor C1 are dropped onto the guide 3. In this state, the lefthand end of the guide 3 is pushed up by the stocker 2, so that the guide is inclined only slightly. Thus, the ampules roll smoothly on the guide and drop into the stocker 2. Since the bottom of the stocker is also inclined, the ampules roll down and collect on the lid plate 7 as shown.

Since the stocker 2 is at the highest level, the ampules drop only a short distance from the guide 3 onto the bottom of the stocker. This minimizes the possibility of breakage of ampules.

Figure 6:
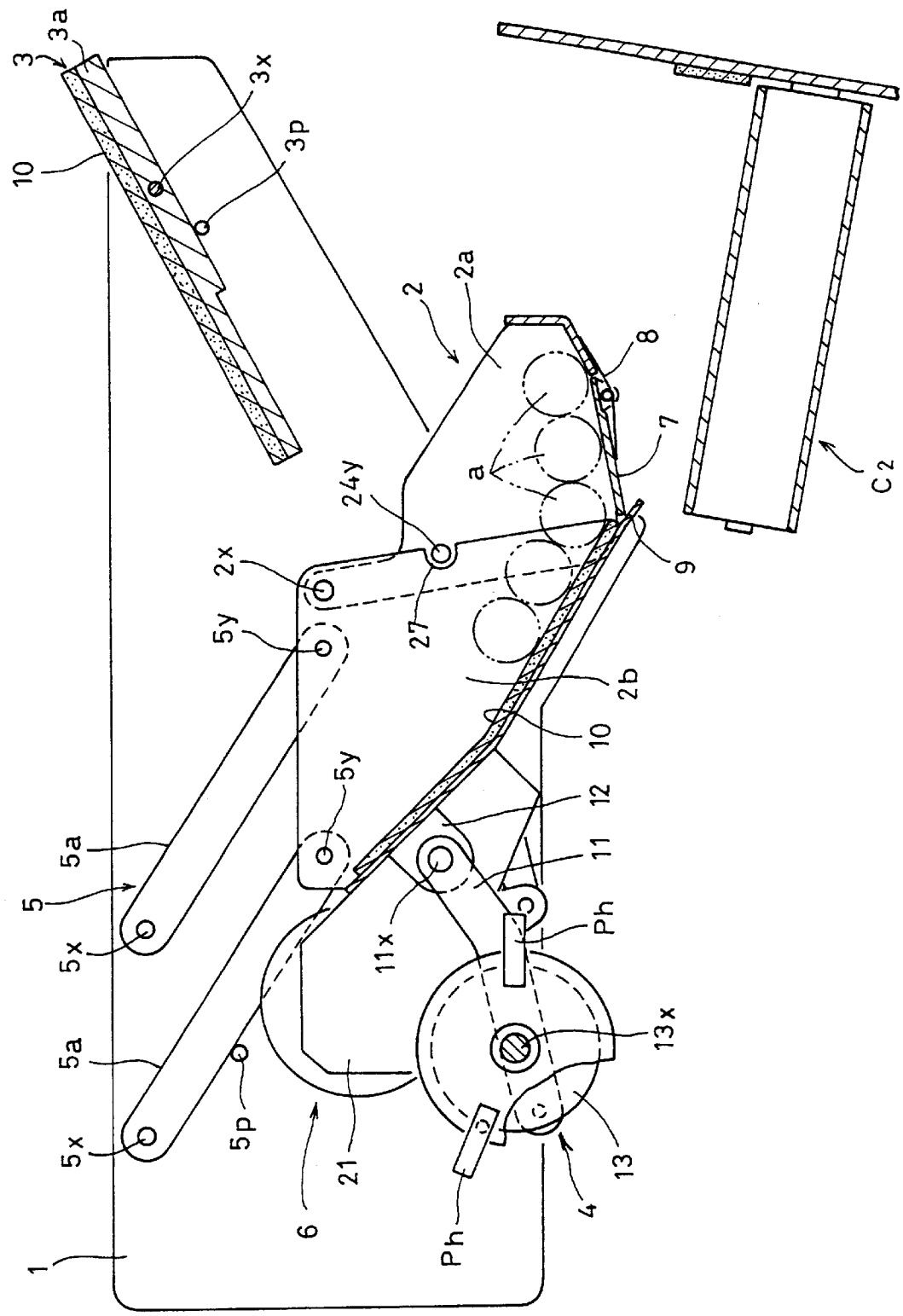
FIGS. 6–8 are side views of the same showing different states.

When all the ampules are collected in the stocker 2, the drive unit 4 is actuated to lower the stocker 2 to the position shown in FIG. 6 together with the actuator unit 6. As the stocker is lowered, the guide 3 pivots counterclockwise because its pivot center 3x is located nearer to the righthand end thereof. Thus, any ampules that may remain on the guide or those which bridge the guide and the stocker will reliably drop into the stocker by the time the stocker is lowered to the position of FIG. 6.

Figure 7:
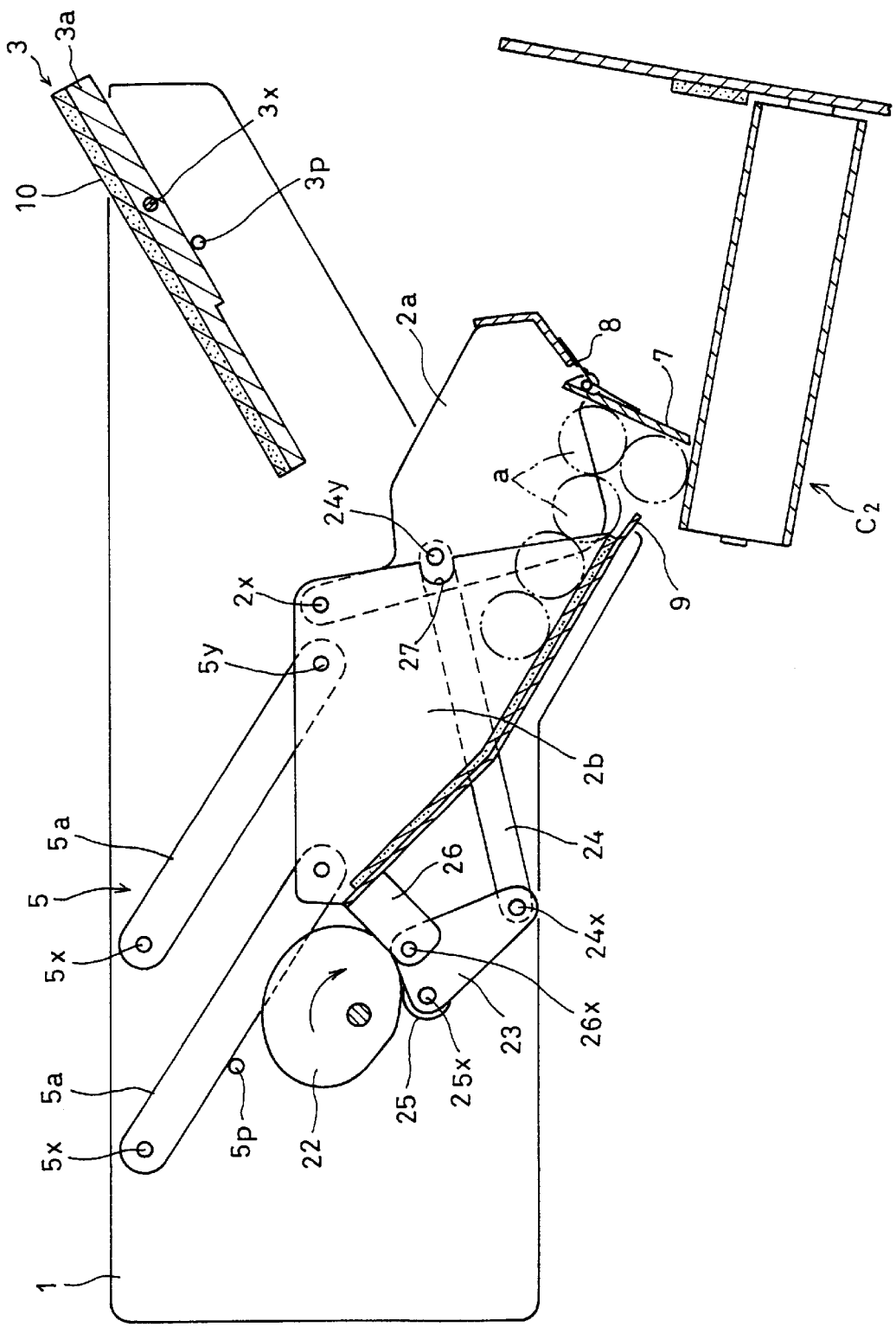

When the stocker is lowered to the position of FIG. 6, the motor 20 is actuated to pivot the end member 2a to the open position shown in FIG. 7. For this purpose, the motor 20 is rotated clockwise to turn the cam 22 clockwise from the state of FIG. 4 to that shown in FIG. 7. As the cam turns clockwise, the triangular plate 23 is biassed to pivot counterclockwise about the pin 26x. This causes the arm 24 to move substantially rightwardly in the figure, thus pivoting the end member 2a about the pin 2x toward the open position.

When the end member 2a begins to pivot toward the open position, the lid plate 7 disengages from the locking member 9. Thus, the plate 7 pivots to open against the force of the spring 8 under the weight of the ampules on the plate 7 as shown in FIG. 7. The lowermost ampule thus lands on the second conveyor C2.

As the end member 2a further pivots toward the fully open position, the opening between the base member 2b and the end member 2a widens gradually, and at the same time, the plate 7 is raised. When the plate 7 is raised so that a gap between the free end of the plate 7 and the top of the conveyor C2 becomes greater than the diameter of ampules, the ampules begin to roll on the conveyor C2 toward its lower end. Thus, by the time the end member 2a is raised to the fully open position, the ampules in the stocker are completely emptied onto the conveyor C2 (FIG. 8). When all the ampules have been discharged, the plate 7 returns to the original position under the force of the spring 8.

The width of the ampule-discharge opening when the end member 2a has been pivoted to the fully open position should be set to be greater than the length of ampules so that even if an ampule or two in the stocker is positioned longitudinally, they will be discharged reliably.

When all the ampules have been discharged from the stocker 2, the latter is raised. When it has been raised to a predetermined height, the motor 20 is actuated to close the end member 2a. Now the entire device is again in the original position.

The device of the present invention may be used to supply ampules from a higher conveyor to trays or bags on a lower conveyor.

Although the end member 2a is mounted so as to be pivotable around the axis 2x in the preferred embodiment, it may be mounted to be slidable in a vertical direction to open and close the discharge opening. Also, although the lid plate 7 is locked by the locking member 9, a locking member may be used instead which is actuated by a cylinder to protrude along the bottom of the base member 2b.

Although the stocker 2 is elevated by the link mechanism and the drive unit 4 in the embodiment, it may be adapted to move by means of a linear guide. Also, although the guide 3 is secured to the side plate 1, it may be mounted on the stocker 2 to move integrally.

Thanks to the above-mentioned arrangement according to the present invention, there is little possibility of the ampules being broken due to contact with one another or due to shock upon dropping. Thus, it is assured that the ampules will be safely transferred from one conveyor to another conveyor.

What is claimed is:

1. An ampule transfer device, provided between a first station and a second station located at a lower level than the first station, for receiving ampules from the first station and delivering the ampules to the second station, said ampule transfer device comprising a stocker and a first drive unit for moving said stocker up and down, said stocker comprising a base member having a first edge, an end member coupled to said base member so as to be movable between a closed position and an open position relative to said base member, a second drive unit for moving said end member between said closed and open positions, a lid member having a second edge and coupled to said end member so as to be movable relative to said end member between a closed position and an open position, said end member and said lid member being arranged such that said second edge engages said first edge when said end member and said lid member are in their respective closed positions, and disengages from said first edge when said end member is moved from its closed position toward its open position by said second drive unit, thereby forming an opening between said first and second edges, wherein said lid member is adapted to be movable toward its open position when said second edge disengages from said first edge, thereby widening said opening between said first and second edges.

2. The device as claimed in claim 1 wherein said lid member is coupled to said end member so as to be pivotable toward its open position under the weight of ampules on said lid member.

3. The device as claimed in claim 1 further comprising a biasing member for biasing said lid member toward its closed position, and a locking member for keeping said first and second edges in engagement with each other when said end member and said lid member are in their respective closed positions.

4. The device as claimed in claim 1 further comprising a guide plate provided between the first station and said stocker so as to be pivotable about a horizontal shaft when ampules are fed thereon from the first station, thereby feeding the ampules thereon into said stocker.

* * * * *